United States Patent
Auschra et al.

(10) Patent No.: US 6,409,778 B1
(45) Date of Patent: Jun. 25, 2002

(54) ADDITIVE FOR BIODIESEL AND BIOFUEL OILS

(75) Inventors: Clemens Auschra, Freiburg; Joachim Vetter, Offenbach; Uwe Boehmke; Michael Neusius, both of Darmstadt, all of (DE)

(73) Assignee: Rohmax Additives GmbH, Darmstadt (DE)

( * ) Notice: Subject to any disclaimer, the term of this patent is extended or adjusted under 35 U.S.C. 154(b) by 0 days.

(21) Appl. No.: 09/530,972

(22) PCT Filed: Nov. 18, 1998

(86) PCT No.: PCT/EP98/07410

§ 371 (c)(1),
(2), (4) Date: Jun. 28, 2000

(87) PCT Pub. No.: WO99/27037

PCT Pub. Date: Jun. 3, 1999

(30) Foreign Application Priority Data

Nov. 21, 1997 (DE) .......................................... 197 51 501
Oct. 14, 1998 (DE) .......................................... 198 47 423

(51) Int. Cl.$^7$ ................................................ C10L 1/18

(52) U.S. Cl. .......................................... 44/388; 44/397

(58) Field of Search .................................. 44/388, 397

(56) References Cited

U.S. PATENT DOCUMENTS

| 3,052,648 | A | * | 9/1962 | Bauer ........................ 260/45.5 |
| 3,249,545 | A | * | 5/1966 | Van Der Voort et al. |
| 4,863,486 | A | * | 9/1989 | Tack et al. |
| 5,188,770 | A | * | 2/1993 | Pennewiss .................. 44/393 |
| 5,389,113 | A | * | 2/1995 | Demmering et al. .......... 44/388 |
| 5,578,090 | A | * | 11/1996 | Bradin ........................ 44/388 |

FOREIGN PATENT DOCUMENTS

| DE | 4040317 | A | * | 6/1992 |
| EP | 0418610 | A | * | 3/1991 |
| EP | 0436872 | A | * | 7/1991 |
| EP | 0542111 | A | * | 5/1993 |
| EP | 0543356 | A | * | 5/1993 |
| EP | 0570093 | A | * | 11/1993 |
| EP | 0626442 | A | * | 11/1994 |
| EP | 0711790 | A | * | 5/1996 |
| GB | 974473 | A | * | 11/1964 |

* cited by examiner

Primary Examiner—Margaret Medley
(74) Attorney, Agent, or Firm—Oblon, Spivak, McClelland, Maier & Neustadt, P.C.

(57) ABSTRACT

The invention relates to a copolymer consisting of the following monomer components: a) 48–98 wt. % of compounds of formula (I), b) 2–30 wt. % of one or several oxygen-containing methacrylates of formula (II) and c) 0–30 wt. % of a methacrylate of formula (III) of styrol, the quantities a)–c) totalling 100 wt. %. The inventive copolymer is suitable as a an additive for diesel fuels and biodiesel.

19 Claims, No Drawings

ADDITIVE FOR BIODIESEL AND BIOFUEL OILS

FIELD OF THE INVENTION

For many years industry has been interested on the one hand in alternative energy sources, which are not based on fossil deposits, and on the other hand in so-called "renewable raw materials". The latter include in particular plant oils, or in other words fatty acid esters, usually triglycerides, which in general can be classified as biodegradable and environmentally harmless. Rapeseed oil (colza oil) can be regarded as the prototype for such oils. Recommendations on application of rapeseed oil as a lubricant can be traced back to the twenties (see D. Holde, Chemiker-Zeitung 1922 (1), p. 4).

Under the impetus of environmental legislation, structural changes in agriculture and the general ecological trend, plant oils and modified plant oils such as rapeseed oil methyl ester (RME) as renewable raw materials are becoming increasingly important as fuels and heating oils. An important consideration for practical use of plant oil methyl esters (PME) is their flowability even at relatively low temperatures. Similarly to conventional diesel fuel, components of the fuel crystallize out from biodiesel at low temperatures, thus impairing filterability and flowability. The term biodiesel and biofuel oils encompasses mixtures of petrochemical base diesel oils and renewable raw materials, although the ratio of petrochemical motor fuel to renewable raw materials in the mixture can vary and is not defined. The filterability of diesel fuels is usually characterized by the CFPP value (cold filter plugging point, determined in accordance with DIN EN 116).

PRIOR ART

Depending on the type of plant oil used as basis and on the quality of modification or treatment, PMEs without additives typically have CFPP values between 0° C. and –15° C. If these were to be used as biodiesel, therefore, fouling of the fuel filter would be expected at relatively low temperatures. For example, CFPP values below –20° C. are stipulated for winter diesel (DIN EN 590). Conventional fluidizing additives for diesel fuels have been found to have only limited effect in PME, and in many cases lower the CFPP temperature only slightly if at all.

German Patent DE 19603696 (Röhm GmbH, Aug. 7, 1977) relates to demulsifiers based on polyalkyl (meth) acrylate cooligomers. The function of the demulsifiers is to destroy emulsions. They are used, for example, to separate oil from water in hydraulic oils.

French Patent FR 2589866 (French Petroleum Institute, May 15, 1987) describes copolymers of short-chain ($C_1$–$C_u$), medium-chain ($C_8$–$C_{14}$) and long-chain ($C_{16}$–$C_{22}$) esters of methacrylic acid and a vinylaromatic component.

European Patent EP 418610 (Röhm GmbH) describes copolymers suitable for improvement of the viscosity index of lubricating oils, which copolymers comprise 80 to 99.5 parts by weight of alkyl (meth)acrylate esterified with a long-chain alcohol and 0.5 to 20 parts by weight of a functionalized alkyl (meth)acrylate, the methacrylic acid being esterified by a $C_2$–$C_6$ alcohol or by a group containing multiple alkoxy units. The copolymers have good shear stability and good dispersant and detergent effect in lubricating oils.

European Patent EP 543356 (Röhm GmbH) describes a process for synthesis of compositions with improved low-temperature behavior for use as fuels or for use as lubricants on the basis of rapeseed oil methyl ester. A mixture capable of lowering the cold filter plugging point to –15° C. to –20° C. is synthesized by the process according to the invention. The resulting precipitates of long-chain fatty acid esters not containing additives are filtered off.

U.S. Pat. No. 5,578,090 (BRI) describes a biodiesel additive comprising fatty acid alkyl esters, glycerol esters and triglycerides. The additive is biodegradable.

European Patent 691355 (Röhm GmbH) describes cooligomers and copolymers with dispersant action on the basis of esters of methacrylic acid with alkoxylated alcohols having a specified content of ethylene oxide or propylene oxide units, which cooligomers and copolymers can be used as ashless dispersants in lubricating oils. The molecular weights of the cooligomers and copolymers with dispersant action range between 1000 and 300,000 daltons.

In addition to the good low-temperature characteristics, good dispersant characteristics can also be expected from these PAMAs modified with polar oxygen-containing comonomers. In other words, there can be expected an active cleaning effect, which contributes to preventing deposits in the fuel-supply system (for example, at injection nozzles).

German Patents DE 3930142 and DE 4423358 describe comparable oxygen-containing dispersant PAMAs and their good dispersant action as lubricating oil additives which simultaneously have excellent compatibility with gasket materials. These applications do not consider the unexpectedly good efficacy for use as additives for biodiesel and biofuel oils.

OBJECT AND ACHIEVEMENT

The object was therefore to provide additives for improvement of the low-temperature behavior, especially of the cold filter plugging point, of fatty acid esters of monohydric alcohols, especially of rapeseed oil methyl ester. As an example, the target was to lower the CFPP from –15° C. to –22° C. in the case of rapeseed oil methyl ester.

Another object was to develop an effective additive for control of the CFPP of RME. More particularly, the object was to achieve reliable adjustment of CFPP values of $\leq 20°$ C. with economic additive proportions of typically $\leq 1$ wt %. It was also anticipated that further characteristics important for the low-temperature flow behavior, such as pour point (ASTM D 92) and softening point (measured per Herzog MC 852), would be influenced favorably by the additive.

A further object in the scope of the invention was to provide mixtures of the inventive polymers and copolymers with biodiesels, which mixtures are suitable for use at low temperatures.

Industry has long used polymeric compounds, otherwise known as "pour point depressants", to lower the pour point of lubricating oils and other mineral oil products. The common structural feature of such polymers is a plurality of alkyl side chains, usually containing 8 to 40, especially 10 to 28 carbon atoms. Poly(meth)acrylic acid esters of long-chain alcohols (PAMA additives) are particularly highly regarded for this purpose.

The object is achieved by a copolymer according to the features of claim 1.

It was found that certain PAMAs functionalized with oxygen-containing polar groups exhibit unexpectedly good CFPP-improving efficacy. Such products are PAMAs with comonomers containing hydroxyl groups and/or ether groups, such as 2-hydroxyethyl methacrylate, hydroxypropyl methacrylate, 2-[2-(2-ethoxyethoxy)ethoxy]ethyl methacrylate, 2-ethoxyethyl methacrylate, 2-methoxyethyl methacrylate, methacrylic acid esters of ethoxylated tridecyl alcohol (oxo alcohol C13+20 C6), such as MARLIPAL 013/200 (Hüls), methacrylic acid esters of methoxypolyethylene glycol, such as Carbowax 350 or Carbowax 750 (Union Carbide), as well as the corresponding acrylate esters, such as 2-hydroxyethyl acrylate, 2-hydroxypropyl acrylate.

The best efficacy was found with monomers containing hydroxyl groups such as 2-hydroxyethyl methacrylate. These additives also have good efficacy with regard to pour point and softening point.

The polymers usable according to the invention can be synthesized with all polymerization methods known in themselves.

WORKING OF THE INVENTION

EXAMPLES

The following examples describe the working of the invention.

1. Materials Used:

| | |
|---|---|
| AMA-I = | methacrylate of Dobanol 25L (Shell): (mixture of isomeric C12 to C15 alcohols with about 80% normal alcohol content) |
| AMA-II = | methacrylate of tallow fatty alcohol: (mixture of n-C16 and n-C18 alcohols) |
| AMA-III = | isodecyl methacrylate |
| HEMA = | 2-hydroxyethyl methacrylate |
| HPMA = | 2-hydroxypropyl methacrylate |
| EOMA = | methacrylate of ethoxylated isotridecyl alcohol with average degree of ethoxylation = 20 |
| ETGMA = | ethyltriglycol methacrylate |
| IN-1 = | tert-butyl perpivalate (75% solution in hydrocarbon) |
| IN-2 = | tert-butyl perisononanoate |
| IN-3 = | tert-butyl peroctoate |
| DDM = | dodecylmercaptan |
| Shell Fluid 2613 = | hydrocarbon mixture (kinematic viscosity at 40° C. = 5.1 mm$^2$/s) |
| DIOA = | Vestinol OA = di-2-ethylhexyl adipate |
| RME = | rapeseed oil methyl ester |
| ALK-1 = | C12 to C15 alcohol Lial 125 = commercial product of Enichem Augusta |
| RME1–3 = | different rapeseed oils available on the market. They differ in characteristics within the usual range of variation for biological products. |

2. General Procedure for Synthesis of a 70% Additive:

In a 2-liter three-necked flask with oil-bath heater, sickle-shaped stirrer, reflux condenser, internal thermometer and N$_2$ inlet/outlet line, there is placed a reaction mixture comprising:

| | |
|---|---|
| 700.00 g | monomer mixture (see Table 1 for composition) |
| 77.78 g | solvent A (see Table 1) |
| X g | DDM (see Table 1) |

After addition of about 10 g dry ice to form an inert atmosphere, this mixture is heated to 75° C. under additional N$_2$, and then a mixture of 1.4 g IN-1 and 1.4 g IN-2 is added. After a temperature maximum of about 120° C. has been exceeded, the mixture is further maintained at 120° C. Four hours and six hours after the first addition of initiator, another 1.4 g of IN-2 is added in each case and the mixture is maintained at 120° C. for a further 4 hours. Thereafter it is diluted with 222.22 g of solvent B (a mixture of different solvents can also be used for this purpose).

All known oil types based on mineral oil (paraffinic, naphthenic, aromatic) and also synthetic fluids (ester oils, PAO, alcohols) as well as natural oils such as rapeseed oil or PMEs and mixtures thereof can be used as solvent A or solvent B. Clear viscous additive concentrates are obtained. Table 1 presents the composition and characterization of the synthesized examples.

Mixtures of copolymers of the present application can contain paraffinic mineral oils or naphthenic mineral oils or aromatic mineral oils or ester oils or modified or unmodified bio-oils or natural plant or animal oils or mixtures of the aforesaid oils.

TABLE 1

Composition and characterization of the additives

| Product Example No. | Composition of the monomer mixture in wt % | Proportion of DDM#) in wt % | Solvent A | Solvent B | Viscosity KV100 [mm$^2$/S] | ηsp/c [ml/g] |
|---|---|---|---|---|---|---|
| 1 | AMA1–AMA2–HEMA 79.3–14.7–6.0 | 1.5 | DIOA | RME1 | 123 | 12.2 |
| 2 | AMA1–AMA2–HEMA 76.8–14.2–9 | 1.5 | DIOA | RME1 | 159 | 12.9 |
| 3 | AMA1–AMA2–EOMA 73.8–13.7–12.5 | 1.0 | DIOA | RME1 | 116 | 15.0 |
| 4 | AMA1–AMA2–ETGMA 79.3–14.7–6.0 | 1.5 | DIOA | RME1 | 93 | 11.9 |
| 5 | AMA1–AMA2–ETGMA 73.8–13.7–12.5 | 1.5 | DIOA | RME1 | 98 | 12.4 |
| 6 | AMA1–AMA2–HEMA 67.5–12.5–20.0 | 1.1 | DIOA | RME1 | 166 | 16.9 |
| 7 | AMA1–AMA2–HPMA 79.3–14.7–6.0 | 1.5 | DIOA | RME1 | 117 | 12.2 |
| 8 | AMA1–AMA2–HPMA 76.8–14.2–9.0 | 1.5 | DIOA | RME1 | 135 | 12.6 |
| 9 | AMA1–HEMA 91–9 | 1.5 | DIOA | RME1 | 174 | 13.3 |

TABLE 1-continued

Composition and characterization of the additives

| Product Example No. | Composition of the monomer mixture in wt % | Proportion of DDM[#] in wt % | Solvent A | Solvent B | Viscosity KV100 [mm$^2$/S] | ηsp/c [ml/g] |
|---|---|---|---|---|---|---|
| 10 | AMA1–HEMA 91–9 | 0.3*) | DIOA | RME1 | | 33.1 |
| 11 | AMA1–HEMA 91–9 | 1.3 | Shell Fluid 2613 | Shell Fluid 2613 | 244 | |
| 12 | AMA1–AMA2–AMA3 MMA–HEMA 88–1–1–1–9 | | Shell Fluid 2613 | Mix 1 | 149 | |

[#]) relative to the monomer mixture
*) synthesized with 0.3% IN-3 instead of the IN-1/IN-2 mixture
MIX 1 = Lial 125/Shell fluid 2613 = 50/50

By virtue of the low kinematic viscosity KV100, these additives can also be processed very well. The specific viscosity nsp/c is a measure of the molecular weight of the various additives.

Tables 2 to 4 show the efficacy of the new additives in several commercially available RME types in comparison with the efficacy of a common prior art PAMA additive, VISCOPLEX 10-310 (RohMax GmbH). CFPP values of $\leq -20°$ C. can be achieved without problems in the various RME grades using the new oxygen-containing additives. At the same time, good values of pour point and softening point are obtained.

TABLE 2

Efficacy of the oxygen-containing additives in RME-1

| Additive | Additive concentration in RME [%] | RME | Pour Point [° C.] (ASTM-D-97) | Softening point [° C.] (Herzog MC852) | CFPP [° C.] (EN 116) |
|---|---|---|---|---|---|
| — | — | RME-1 | −12 | −16.5 | −15 |
| Vicoplex 10-310 | 0.2 | RME-1 | −30 | | −14 |
| | 0.5 | | −42 | | −18 |
| | 1.0 | | −42 | | −19 |
| Example 1 | 0.2 | RME-1 | −39 | −42.3 | −16 |
| | 0.5 | | −42 | −42.6 | −18 |
| | 1.0 | | −42 | −42.7 | −20 |
| Example 2 | 0.2 | RME-1 | −42 | −44.9 | −16 |
| | 0.5 | | −42 | −45.4 | −22 |
| | 1.0 | | −42 | −44.1 | −25 |
| Example 3 | 0.2 | RME-1 | −39 | −42.7 | −15 |
| | 0.5 | | −42 | −43.1 | −19 |
| | 1.0 | | −42 | −42.0 | −20 |
| Example 4 | 0.2 | RME-1 | −36 | −43.2 | −17 |
| | 0.5 | | −42 | −45.0 | −19 |
| | 1.0 | | −42 | −43.5 | −27 |

TABLE 3

Efficacy of the oxygen-containing additives in RME-2

| Additive | Additive concentration in RME [%] | RME | Pour Point [° C.] (ASTM-D-97) | Softening point [° C.] (Herzog MC852) | CFPP [° C.] (EN 116) |
|---|---|---|---|---|---|
| — | — | RME-2 | −9 | −13.9 | −10 |
| Vicoplex 10-310 | 0.2 | RME-2 | −24 | −29.9 | −10 |
| | 0.5 | | −30 | −40.6 | −13 |
| | 1.0 | | −39 | −40.9 | −16 |
| Example 9 | 0.2 | RME-2 | −18 | −25.5 | −14 |
| | 0.5 | | −39 | −41.5 | −24 |
| | 1.0 | | −33 | −43.0 | −25 |
| Example 10 | 0.2 | RME-2 | −18 | −26.5 | −12 |
| | 0.5 | | −27 | −40.6 | −15 |
| | 1.0 | | −36 | −41.9 | −23 |

TABLE 4

Efficacy of the oxygen-containing additives in RME-3

| Additive | Additive concentration in RME [%] | RME | Pour Point [° C.] (ASTM-D-97) | Softening point [° C.] (Herzog MC852) | CFPP [° C.] (EN 116) |
|---|---|---|---|---|---|
| — | — | RME-3 | −9 | −13.3 | −17 |
| Vicoplex 10-310 | 0.2 | RME-3 | −24 | −33.8 | −12 |
|  | 0.5 |  | −36 | −41.5 | −15 |
|  | 1.0 |  | −39 | −41.7 | −18 |
| Example 9 | 0.2 | RME-3 | −24 | −27.3 | −16 |
|  | 0.5 |  | −39 | −41.0 | −21 |
|  | 1.0 |  | −27 | −42.2 | −25 |
| Example 11 | 0.2 | RME-3 | −24 | −27.6 | −16 |
|  | 0.5 |  | −39 | −41.0 | −20 |
|  | 1.0 |  | −36 | −42.5 | −25 |
| Example 12 | 0.2 | RME-3 | −24 | −28.8 | −16 |
|  | 0.5 |  | −39 | −41.3 | −22 |
|  | 1.0 |  | −39 | −42.6 | −20 |

What is claimed is:

1. A biodiesel composition comprising:
   i) a biofuel fatty acid ester of monohydric alcohols as a base fuel; and
   ii) 0.005 to 5 wt. % of a copolymer comprising the following monomer components:
   a) 48 to 98 wt % of compounds of formula I

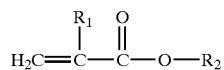

(I)

where:
   $R_1$=H or $CH_3$
   $R_2$ =alkyl with a chain length of 8 to 30, which can also be branched;
   b) 2 to 30 wt % of one or more oxygen-containing compounds of formula II

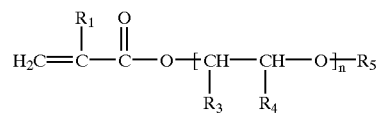

(II)

where:
   $R_1$=the same meanings as in formula I
   $R_3$=H or $CH_3$
   $R_4$=H or $CH_3$
   $R_5$=H or an alkyl group with 1 to 20 carbon atoms, which can also be branched, or alkyl group with 1 to 20 carbon atoms substituted by one or more aryl groups
   n=a number between 1 and 30 as well as
   c) optionally 0 to 30 wt % of a methacrylate of formula III

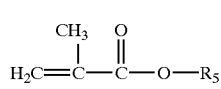

(III)

where:
   $R_5=C_1$ to $C_4$ alkyl or styrene, the proportions of a) to c) adding up to 100 wt %.

2. The biodiesel of claim 1, wherein said fatty acid ester of monohydric alcohol is rapeseed oil methyl ester.

3. The biodiesel of claim 1, wherein monomer b) is hydroxyethyl methacrylate.

4. The biodiesel of claim 1, wherein monomer b) is hydroxypropyl methacrylate.

5. The biodiesel of claim 1, wherein the average molecular weight of said copolymer is between 3000 and 1,000,000.

6. The biodiesel of claim 1, wherein the monomer b is present in a form grafted partly or completely onto a preformed PAMA polymer.

7. The biodiesel of claim 6, wherein $R_2$ of the compounds of formula I is a branched or nonbranched alkyl with a chain length between 10 and 20 carbon atoms.

8. A motor fuel comprising:
   a mixture of conventional mineral oil motor fuels or fuels with biodiesel of a fatty acid ester of monohydric alcohols wherein the proportion of biodiesel lies between 5 to 100 wt. %; and 0.005 wt. % based on said mixture of a copolymer comprising the following monomeric components:
   a) 48 to 98 wt % of compounds of formula I

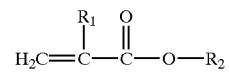

(I)

where:
   $R_1$=H or $CH_3$
   $R_2$=alkyl with a chain length of 8 to 30, which can also be branched;
   b) 2 to 30 wt % of one or more oxygen-containing compounds of formula II

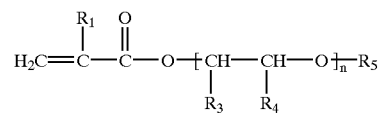

(II)

where:
   $R_1$=the same meanings as in formula I
   $R_3$=H or $CH_3$
   $R_4$=H or $CH_3$
   $R_5$=H or an alkyl group with 1 to 20 carbon atoms, which can also be branched, or alkyl group with 1 to 20 carbon atoms substituted by one or more aryl groups
   n=a number between 1 and 30 as well as c) optionally 0 to 30 wt % of a methacrylate of formula III

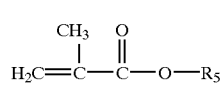

(III)

where:
R$_5$=C$_1$ to C$_4$ alkyl or styrene, the proportions of a) to c) adding up to 100 wt %.

9. The motor fuel of claim 6, wherein monomer b) is hydroxyethyl methacrylate.

10. The motor fuel of claim 6, wherein monomer b) is hydroxypropyl methacrylate.

11. The motor fuel of claim 6, wherein the average molecular weight of said copolymer is between 3000 and 1,000,000.

12. The motor fuel of claim 6, wherein the monomer b is present in a form grafted partly or completely onto a preformed PAMA polymer.

13. The motor fuel of claim 12, wherein R$_2$ of said compounds of formula I is a branched or nonbranched alkyl with a chain length between 10 and 20 carbon atoms.

14. A method of improving the low-temperature flow behavior and CFPP of biodiesels and biofuel comprising adding to a biodiesel and biofuel of a fatty acid ester of mono alcohols in need thereof, a CFPP improving efective amounts, a copolymer comprising the following monomer component a) 48 to 98 wt % of compounds of formula I

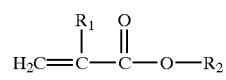

(I)

where:
R$_1$=H or CH$_3$
R$_2$=alkyl with a chain length of 8 to 30, which can also be branched b) 2 to 30 wt % of one or more oxygen-containing compounds of formula II

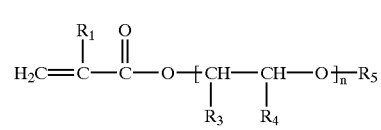

(II)

where:
R$_1$=the same meanings as in formula I
R$_3$=H or CH$_3$
R$_4$=H or CH$_3$
R$_5$=H or an alkyl group with 1 to 20 carbon atoms, which can also be branched, or alky group with 1 to 20 carbon atoms substituted by one or more aryl groups
n=a number between 1 and 30 as well as c) optionally 0 to 30 wt % of a methacrylate of formula III

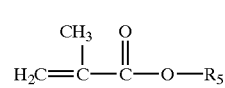

(III)

where:
R$_5$=C$_1$ to C$_4$ alkyl or styrene, the proportions of a) to c) adding up to 100 wt %.

15. The method of claim 14, wherein monomer b) is hydroxyethyl methacrylate.

16. The method of claim 14, wherein monomer b) is hydroxypropyl methacrylate.

17. The method of claim 14, wherein the average molecular weight of said copolymer is between 3000 and 1,000,000.

18. The method of claim 14, wherein the monomer b is present in a form grafted partly or completely onto a preformed PAMA polymer.

19. The method of claim 18, wherein R$_2$ of said compounds of formula I is a branched or nonbranched alcohol with a chain length between 10 and 20 carbon atoms.

* * * * *